Figure 4:
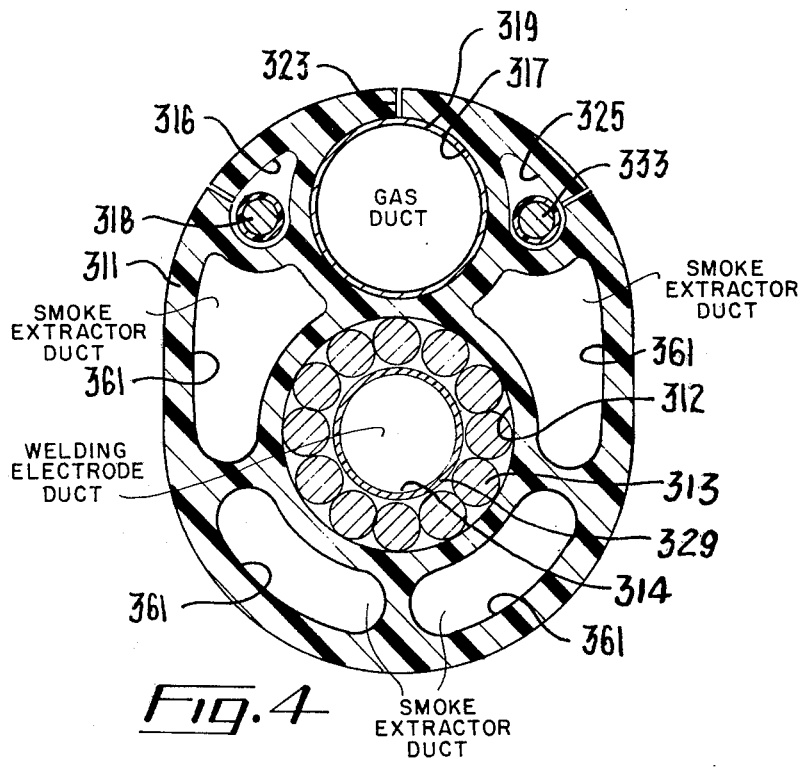

United States Patent [19]
Gatfield

[11] 3,992,565
[45] Nov. 16, 1976

[54] COMPOSITE WELDING CABLE HAVING GAS DUCTS AND SWITCH WIRES THEREIN

[75] Inventor: Edward W. Gatfield, Batavia, Ill.
[73] Assignee: Belden Corporation, Geneva, Ill.
[22] Filed: July 7, 1975
[21] Appl. No.: 593,428

[52] U.S. Cl. .................... 174/15 WF; 174/47; 174/115
[51] Int. Cl.² ............................................ H01B 7/34
[58] Field of Search ............. 174/15 C, 15 WF, 47, 174/70 R, 70 C, 72 R, 115, 97, 16 R; 219/130

[56] References Cited
UNITED STATES PATENTS

| | | | |
|---|---|---|---|
| 3,281,571 | 10/1966 | Gilmore | 174/47 X |
| 3,596,786 | 8/1971 | Bernard | 174/15 WF |
| 3,775,584 | 11/1972 | Moerke | 219/130 |
| 3,798,409 | 3/1974 | Troyer et al. | 219/130 |
| 3,803,381 | 4/1974 | Bernard et al. | 219/130 |
| 3,836,747 | 9/1974 | Wlos | 219/130 |
| 3,886,344 | 5/1975 | Fratzreb et al. | 219/130 |

FOREIGN PATENTS OR APPLICATIONS

| | | | |
|---|---|---|---|
| 524,909 | 5/1956 | Canada | 174/47 |
| 977,878 | 4/1951 | France | 174/97 |
| 323,095 | 8/1957 | Switzerland | 174/47 |
| 530,297 | 12/1940 | United Kingdom | 174/70 C |

Primary Examiner—Arthur T. Grimley
Attorney, Agent, or Firm—Fitch, Even, Tabin & Luedeka

[57] ABSTRACT

A welding cable is described in which a welding current conductor, switch wires and a gas conductor tube are all contained in longitudinal passages in a single cable jacket. The passages containing the gas conductor tube and the switch wires are accessible through longitudinal openings in the jacket coextensive with the passages to facilitate insertion and removal of the switch wires and the gas conductor tube.

9 Claims, 5 Drawing Figures

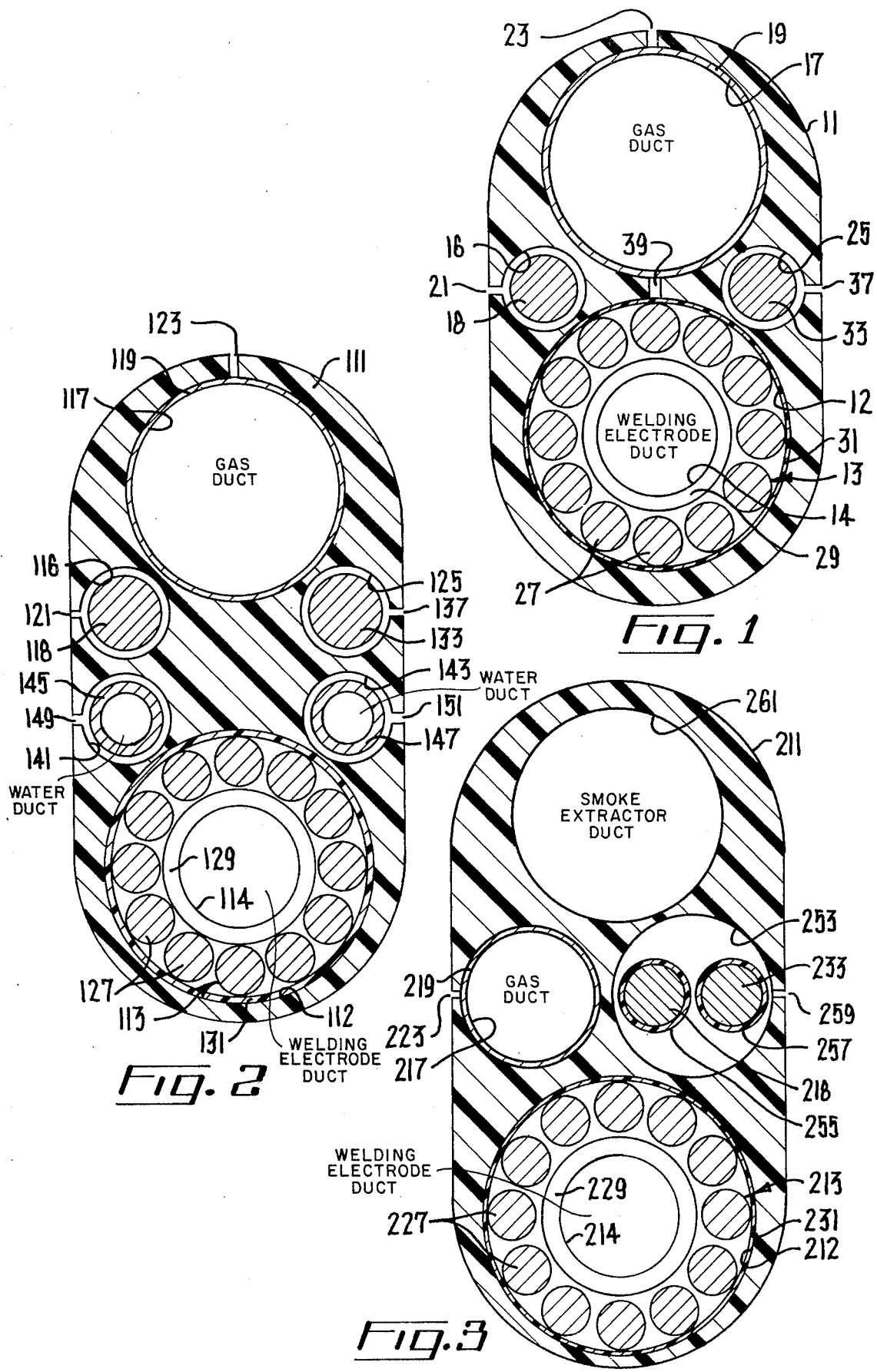

COMPOSITE WELDING CABLE HAVING GAS DUCTS AND SWITCH WIRES THEREIN

This invention relates generally to welding cables and, more particularly, to an improved welding cable of the type which requires a conduit for the electrode wire, a welding current conductor, a tube to convey inert shielding gas, and switch wires by which the welding process is controlled.

Certain welding processes, for example the so-called metal inert gas or MIG welding process, require the feeding in of electrode wire and inert shielding gas to the weld region, as well as the conduction of welding current and switch current to the welding region. Accordingly, various welding designs have been developed which provide a conduit for the electrode wire, either separate from or in connection with a cabled conductor for welding current, a tube to convey the inert shielding gas, and switch wires by which the welding process is controlled at the welding gun. However, such prior art cables have suffered from certain disadvantages.

One prior art cable construction consists of the separate components (i.e. copper conductor, electrode wire conduit, two switch leads, and inert gas tube) taped or bundled together by axially spaced ties. Although the components, such as the copper conductor or electrode wire conduit, are relatively easy to replace in the event of failure, all of the components are exposed to the rugged work environment, increasing the probability of failure. Moreover, such cables may have an undesirable appearance from a sales standpoint, and may be relatively difficult to handle.

Another prior art cable design involves the placing of the foregoing components within a loose fitting rubber sheath. Although this provides more protection for the components and an improved appearance and handling characteristics, it is relatively difficult to replace the sheath after removing the sheath to replace defective components.

It is an object of the present invention to provide an improved welding cable.

Another object of the invention is to provide an improved welding cable suitable for metal inert gas welding.

A further object of the invention is to provide a metal inert gas welding cable in which components are protected but are easily replaced if defective.

Other objects of the invention will become apparent to those skilled in the art from the following description, taken in connection with the accompanying drawings wherein:

FIG. 1 is a cross sectional view illustrating a cable constructed in accordance with the invention; and FIGS. 2–5 are cross sectional views of further embodiments of the invention.

Very generally, the welding cable of the invention comprises a cable jacket 11 having a first longitudinal passage 12 therein. A welding current conductor 13 is disposed in the first longitudinal passage. The cable jacket has second and third longitudinal passages 16 and 17 therein. Switch wire means 18 and a gas conductor tube 19 are disposed in the second and third longitudinal passages. Longitudinal openings 21 and 23 are provided in the cable jacket coextensive with the second and third longitudinal passages communicating therefrom to the exterior of the jacket to facilitate insertion and removal of the switch wire means and the gas conductor tube from the cable jacket.

Referring now more particularly to FIG. 1, the cable jacket 11 comprises a generally oval cross section member of a suitable flexible electrical insulating material, such as rubber, polyvinyl chloride, polyethylene, etc. In the embodiment of FIG. 1, the jacket 11 is provided with the relatively large longitudinal passage 12 which is of circular cross section and which extends the length of the jacket toward one side thereof. A further longitudinal passage 17 is also provided in the jacket and extends along the side thereof opposite the side to which the passage 12 is adjacent. The passage 17 is of circular cross section and is of a diameter to accommodate the gas conductor tube 19. The jacket is further provided with the longitudinal passage 16 which is in the region between the passage 12 and the passage 17 and which extends the length of the jacket. The passage 16 is of circular cross section and is of a diameter to accommodate the switch wire means. A longitudinal passage 25 is provided in the jacket symmetrically positioned with respect to the longitudinal passage 16 in the region between the passages 12 and 17. The longitudinal passage 25 may be of identical cross section to that of the passage 16.

The welding current conductor 13 is disposed in the passage 12 and comprises a plurality of conductor wires 27 which are arranged to form an annulus. The welding current conductor additionally comprises a flexible conduit 29 which is disposed within the annulus formed by the wires 27 and retains the wires in proper position. The conduit 29 is comprised, in the illustrated embodiment, of a flexible coil spring and defines a passage 14 through which welding electrode wire may be fed into the welding area as is known in the art. An additional conduit within the conduit 29 may be provided to accommodate an electrode wire of alternate diameter. An outer layer 31 of a suitable insulation material surrounds the outer part of the welding current conductor 13 positioned between the wires 27 and the inner wall of the passage 12. The layer 31 may be comprised of a suitable electrical insulating tape wrapped about the conductor, such as a tape of material known under the trademark MYLAR.

The gas conduit 19 is disposed in the upper longitudinal passage 17 in the jacket 11. The conduit 19 may be of any suitable flexible material for conducting an inert gas to the weld area as is known in the art of metal inert gas welding. Suitable connections, not shown, are provided at the end of the conduit 19 for supplying gas to the weld area.

Electrical leads for the switch of a welding gun, not shown, in order to provide control over the welding operation are contained in the longitudinal passages 16 and 25. The switch leads include a wire 18 disposed in the passage 16 and a further wire 33 disposed in the passage 25. The wires are suitably connected, as is known in the art.

During the course of a welding operation, one or more of the components may fail or become damaged and therefore replacement may be necessary. To this end, the jacket 11 is provided with a plurality of longitudinal openings therein coextensive with the longitudinal passages to facilitate insertion and removal of the components contained in the passages. Thus, the longitudinal opening 21 is provided from the exterior of the jacket 11 to the longitudinal passage 16. A similar opening 37 is provided from the exterior of the jacket 11 to the longitudinal passage 25. The openings 21 and 37 enable the wires 18 and 33 to be readily inserted or removed from the longitudinal passages 16 and 25. A further longitudinal opening 23 is provided extending from the exterior of the jacket 11 to the passage 17. This facilitates insertion and removal of the gas conduit 19 from the passage 17. An additional longitudinal opening 39 may be provided extending from the longitudinal passage 12 to the longitudinal passage 17. This enables the jacket 11 to be pulled apart to enable the welding current conductor 13 to be inserted in or removed from the passage 12. If the longitudinal opening 39 is not provided, the welding current conductor 13 is inserted in the passage 12 by feeding it lengthwise through the jacket.

The cable construction above described may be manufactured in all sizes and thus constitutes a significant design improvement over the prior art. If necessary in use, the assembled cable may be taped at longitudinal intervals with electrician's tape or the like to prevent the openings or slits 21, 23 and 37 from opening up inadvertently while the cable is in use.

Referring now to FIG. 2, a further embodiment of the invention is illustrated. The elements of the cable construction of FIG. 2 which are substantially identical in design and function to the elements of the embodiment of FIG. 1 have been given identical reference numbers preceded by a 1. Accordingly, and to avoid unnecessary repetition, they are not referred to herein in detail.

In addition to the components similar to those of the cable structure of FIG 1, the embodiment of FIG. 2 is provided with longitudinal passages 141 and 143. These passages are in the same general region of the passages 116 and 125, and to accommodate the passages, the cable jacket 111 is made of slightly larger cross section that that illustrated in FIG. 1. The passages 141 and 143 are provided with water coolant conduits 145 and 147 which are made of suitable flexible material for conducting water to and from the weld area and thus cooling the welding gun, as is known in the art. The passages 141 and 143 are provided with longitudinal openings 149 and 151, respectively, communicating from the passages to the outside of the jacket 111. This facilitates insertion and removal of the conduits from the passages.

Referring now to FIG. 3, another embodiment of the invention is shown. In the embodiment of FIG. 3, those elements having function and design substantially the same as elements of FIG. 1 have been given corresponding reference numbers preceded by a 2. Thus, to avoid repetition, these elements will not be discussed in detail.

In the embodiment of FIG. 3, although the components are substantially the same as those in the embodiment of FIG. 1, they are rearranged in their placement in the cross section of the jacket 211. Thus, the passage 253 is provided which is sufficiently large in cross section so as to carry both of the welding gun switch wires 218 and 233. The switch wires 218 and 233 are covered with outer insulating jackets 255 and 257, respectively. The longitudinal opening 259 communicates from the outside of the jacket 211 to the passage 253 to enable insertion and removal of the switch wires therein. The longitudinal passage 217 for the inert gas conduit 219 is positioned slightly above and to the left of the welding wire conduit 212.

A large longitudinal passage 261 is provided in the jacket 211 extending the length thereof. The passage 261 forms a conduit for the purpose of extracting smoke from the weld area. The conduit 261 may be attached, at one end of the cable, to a suitable evacuating system, not shown, for the purpose of drawing smoke from the weld area. In the embodiment illustrated in FIG. 3, the jacket 211 may be enlarged as necessary in cross section to accommodate cooling water conduits similar to the conduits 145 and 147 in FIG. 2 if such is desired.

Referring now to FIG. 4, a further embodiment of the invention is shown. The embodiment of FIG. 4 is similar to that of FIG. 1 but, in addition to the gas tube, switch leads and weld current conductor, employs a plurality of passages in the cable jacket 11 for conducting air and smoke away from the weld area. The function is similar to that of the passage 261 in FIG. 3 and therefore the passages in the embodiment of FIG. 4 which are similar have been given the reference number 361. The other elements of the embodiment of FIG. 4 similar to those of FIG. 1 have been given identical reference numbers preceded by a 3.

As the air and smoke are pulled through the length of the cable in the passages 361 from the weld area, the metallic (copper) conductor 313 is cooled because of its close proximity to the passages 361. By cooling the conductor in this matter, efficient operation in the transmittal of the welding current results. Moreover, a reduction in the amount of copper conductor required results because of the cooling, and the size of the conductor can be reduced as much as one American wire gauge size over that required if the cable were not so cooled. The smaller amount of copper conductor reduces the cost, decreases cable weight, and improves cable pliability to enhance manual or mechanized operation.

Figure 5:
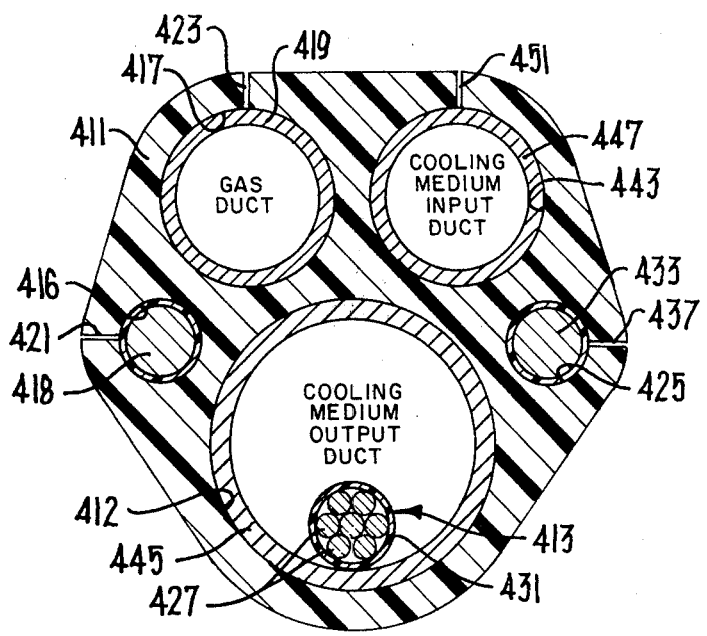

Referring now more particularly to FIG. 5, an embodiment of the invention is shown for the purpose of operating a so-called tungsten inert gas (TIG) welding torch. Elements of the embodiment of FIG. 5 which are similar to elements of the embodiment of FIG. 1 have been given identical reference numerals preceded by a 4. In the embodiment of FIG. 5, the passages 417 and 443 are placed side by side, with the tubing 419 providing a conduit for the inert gas. The tubing 447 in the passage 443 provides a conduit for a cooling medium to be conducted through the cable from the weld torch after cooling same. The conduit or tubing 445 for conducting coolant to the weld torch is provided in the longitudinal passage 412. The weld conductor 413 is shown comprising a plurality of cable strands 427 surrounded by a thin insulating jacket 431 and being disposed within the tube or conduit 445. In the event a further switch lead is desired, in addition to the switch leads 418 and 433, this additional lead may be provided in a longitudinal passage, not shown, formed in the jacket 411 in the space slightly above and between the longitudinal passages 417 and 443.

It may be seen that the invention provides an improved welding cable construction which is capable of conveying welding current, inert shielding gas, coolant, and switching signals and which is a rugged and serviceable structure, easily handled. Various components may be peeled out and snapped in for repair or replacement and all components are protected from the work environment to a substantial degree. The construction requires minimal space and is an attractive packaging arrangement.

Various modifications of the invention in addition to those shown and described herein will become apparent to those skilled in the art from the foregoing description and accompanying drawings. Such modifications are intended to fall within the scope of the appended claims.

What is claimed is:

1. A welding cable comprising, a cable jacket having a first longitudinal passage therein, a welding current conductor disposed in said first longitudinal passage, said cable jacket having second and third longitudinal passages therein, switch wire means and a gas conductor tube disposed in said second and third longitudinal passages, said cable jacket including longitudinal openings therein coextensive with said second and third longitudinal passages communicating therefrom to the exterior of said jacket to facilitate insertion and removal of said switch wire means and said gas conductor tube from said cable jacket.

2. A welding cable in accordance with claim 1 wherein said welding current conductor includes a flexible hollow core element defining a passage for welding electrode wire, a plurality of wires forming an annular array about said core element, and an outer wrapper of insulation surrounding said plurality of wires.

3. A welding cable according to claim 1 wherein said cable jacket includes second, third and fourth longitudinal passages therein, wherein said switch wire means comprise a pair of switch wires, one in said second longitudinal passage and one in said fourth longitudinal passage, and wherein said gas conductor tube is in said third longitudinal passage, and a further longitudinal opening coextensive with said fourth longitudinal passage communicating therefrom to the exterior of said jacket to facilitate insertion and removal of said switch wire means and said gas conductor tube from said cable jacket.

4. A welding cable according to claim 3 wherein said cable jacket includes fifth and sixth longitudinal passages therein, a water conduit disposed in each of said fifth and sixth longitudinal passages, and longitudinal openings coextensive with each of said fifth and sixth longitudinal passages communicating therefrom to the exterior of said jacket to facilitate insertion and removal of said water conduits therein from said cable jacket.

5. A welding cable according to claim 1 wherein said switch wire means comprise a pair of switch wires both in said second longitudinal passage, wherein said gas conductor tube is in said third longitudinal passage, and wherein said cable includes a fourth longitudinal passage therein for conducting smoke from the welding area.

6. A welding cable according to claim 3 wherein said cable jacket includes a plurality of further longitudinal passages therein for conducting air and smoke away from the weld area.

7. A welding cable according to claim 3 including a first coolant conductor tube in said first longitudinal passage, wherein said cable jacket includes a fifth longitudinal passage, and including a second coolant conductor tube in said fifth longitudinal passage.

8. A welding cable comprising, a cable jacket having a first longitudinal passage therein, a welding current conductor disposed in said first longitudinal passage, said welding current conductor being of annular cross section and defining a passage for welding electrode wire, said cable jacket having a second longitudinal passage therein, a gas conductor tube disposed in said second longitudinal passage, said cable jacket having third and fourth longitudinal passages therein positioned on opposite sides of the region between said first and second longitudinal passages, a pair of switch wires, one in each of said third and fourth longitudinal passages, said cable jacket including longitudinal openings therein coextensive with said second, third and fourth longitudinal passages communicating therefrom to the exterior of said jacket to facilitate insertion and removal of said switch wires and said gas conductor tube from said cable jacket.

9. A welding cable according to claim 8 wherein said cable jacket includes a further longitudinal opening therein coextensive with said first and second longitudinal passages communicating therebetween to facilitate insertion and removal of said welding current conductor in said cable jacket.

* * * * *